(12) United States Patent
Kondo et al.

(10) Patent No.: US 11,061,427 B2
(45) Date of Patent: Jul. 13, 2021

(54) OPERATING DEVICE

(71) Applicant: KAWASAKI JUKOGYO KABUSHIKI KAISHA, Kobe (JP)

(72) Inventors: Akihiro Kondo, Nishinomiya (JP); Hiroaki Shimizu, Kakogawa (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 305 days.

(21) Appl. No.: 16/319,515

(22) PCT Filed: Jul. 20, 2017

(86) PCT No.: PCT/JP2017/026332
§ 371 (c)(1),
(2) Date: Jan. 22, 2019

(87) PCT Pub. No.: WO2018/016600
PCT Pub. Date: Jan. 25, 2018

(65) Prior Publication Data
US 2019/0294197 A1    Sep. 26, 2019

(30) Foreign Application Priority Data

Jul. 21, 2016 (JP) .............................. JP2016-143620

(51) Int. Cl.
*G05G 5/05* (2006.01)
*G05G 9/047* (2006.01)
(Continued)

(52) U.S. Cl.
CPC ............... *G05G 5/05* (2013.01); *G05G 9/047* (2013.01); *G05G 25/00* (2013.01); *G06F 3/0338* (2013.01)

(58) Field of Classification Search
CPC ............ G05G 5/05; G05G 5/03; G05G 9/047; G05G 2009/04707; G05G 2009/04722;
(Continued)

(56) References Cited

U.S. PATENT DOCUMENTS 4,994,669 A * 2/1991 Stern ....................... G01D 5/34
250/221
5,773,773 A * 6/1998 McCauley ............. G05G 9/047
200/6 A
(Continued)

FOREIGN PATENT DOCUMENTS

CN         101571729 A    11/2009
DE         29511764 U1    10/1996
(Continued)

OTHER PUBLICATIONS

JPO Translation of the Description of JP 10020950 A, Stoecken, Jan. 23, 1998. (Year: 2020).*

*Primary Examiner* — Daniel D Yabut
(74) *Attorney, Agent, or Firm* — Oliff PLC

(57) ABSTRACT

An operating device includes: an operating lever extending in a first direction and including a first end-side part in the first direction, the first end-side part being operable; a casing supporting a first-direction intermediate part of the operating lever; first and second sensors arranged in the casing so as to be spaced apart from each other in a second direction perpendicular to the first direction and be adjacent to a second end-side part in the first direction of the operating lever; and third and fourth sensors arranged in the casing so as to be spaced apart from each other in a third direction perpendicular to the first and second directions and be adjacent to the second end-side part of the operating lever, wherein each of the first to fourth sensors outputs a signal in accordance with a load applied from the operating lever.

8 Claims, 11 Drawing Sheets

(51) Int. Cl.
*G05G 25/00* (2006.01)
*G06F 3/0338* (2013.01)

(58) Field of Classification Search
CPC .......... G05G 2009/04725; G05G 2009/04729; G05G 2009/0474; G05G 2009/04744; G05G 2009/04762; G05G 2009/04766; G05G 2009/04703; G05G 25/00; G06F 3/0338; H01H 25/04; H01H 25/041; H01H 25/00; Y10T 74/2021; Y10T 74/20612
See application file for complete search history.

(56) References Cited

U.S. PATENT DOCUMENTS

| | | | |
|---|---|---|---|
| 5,831,596 A * | 11/1998 | Marshall | G01D 5/145 345/161 |
| 5,883,346 A | 3/1999 | Stocken | |
| 5,952,631 A * | 9/1999 | Miyaki | H03K 17/968 200/6 A |
| 6,030,291 A * | 2/2000 | Maki | G05G 9/047 345/161 |
| 6,034,336 A * | 3/2000 | Lee | H01H 25/04 200/18 |
| 6,201,196 B1 | 3/2001 | Wergen | |
| 6,400,354 B1 * | 6/2002 | Pin-Chien | G06F 3/0338 345/161 |
| 2008/0186279 A1 * | 8/2008 | Van Dalen | G06F 3/0338 345/163 |
| 2009/0007684 A1 * | 1/2009 | Kurtz | G01L 5/223 73/767 |
| 2009/0273490 A1 | 11/2009 | Ishikawa et al. | |

FOREIGN PATENT DOCUMENTS

| | | |
|---|---|---|
| JP | H04-165108 A | 6/1992 |
| JP | H06-161655 A | 6/1994 |
| JP | 3030170 U | 10/1996 |
| JP | H09-204234 A | 8/1997 |
| JP | H10-20950 A | 1/1998 |
| JP | 2002-351562 A | 12/2002 |
| JP | 2004-192228 A | 7/2004 |
| WO | 96/38810 A1 | 12/1996 |

* cited by examiner

OPERATING DEVICE

TECHNICAL FIELD

The present invention relates to an operating device including an operating lever which can be operated in at least two different directions, such as a front-rear direction and a left-right direction.

BACKGROUND ART

Each of various machines, such as construction machines, aircrafts, and game devices, includes an operating device through which an operator inputs various commands to the machine. Known as one example of the operating device is an electric operating device of PTL 1. The electric operating device of PTL 1 is configured such that: an operating lever is supported by a main body through a universal joint; and the operating lever is tiltable in an X direction and a Y direction by the universal joint. The main body is provided with a reaction force mechanism constituted by a cam, a push rod, and a spring in order to generate reaction force with respect to an operation of the operating lever. The reaction force mechanism generates the reaction force in accordance with a tilt angle of the operating lever. Further, the main body is provided with two gimbals, and each gimbal turns in accordance with the tilt of the operating lever in the X direction and the Y direction. A rotation sensor is attached to each gimbal and detects a turning angle of the gimbal. As above, the electric operating device detects the tilt angle of the operating lever in each of the X direction and the Y direction based on the turning angles of the two gimbals and outputs a signal in accordance with the tilt angle of the operating lever, i.e., an operation amount of the operating lever.

CITATION LIST

Patent Literature

PTL 1: Japanese Laid-Open Patent Application Publication No. 2004-192228

SUMMARY OF INVENTION

Technical Problem

As described above, in the electric operating device of PTL 1, the universal joint is used to tilt the operating lever, and the gimbals are used to detect an operation direction (tilt direction) of the operating lever and the operation amount of the operating lever. Further, the reaction force mechanism that is a complex structure is used to apply operation reaction force to the operating lever in accordance with the tilt angle. Therefore, the number of parts of the electric operating device increases, and the electric operating device increases in size.

An object of the present invention is to provide an operating device which can be downsized.

Solution to Problem

An operating device of the present invention includes: an operating lever extending in a first direction and including a first end-side part in the first direction, the first end-side part being operable; a casing supporting a first-direction intermediate part of the operating lever; first and second sensors arranged in the casing so as to be spaced apart from each other in a second direction perpendicular to the first direction and be adjacent to a second end-side part in the first direction of the operating lever; and third and fourth sensors arranged in the casing so as to be spaced apart from each other in a third direction perpendicular to the first and second directions and be adjacent to the second end-side part of the operating lever, wherein each of the first to fourth sensors outputs a signal in accordance with a load applied from the operating lever.

According to the present invention, when the first end-side part of the operating lever is operated, the operating lever moves based on the principle of leverage at a fulcrum that is the intermediate part of the operating lever, and the second end-side part presses the adjacent sensor. At this time, the second end-side part of the operating lever can press the corresponding sensor with a pressing load proportional to an operation load, and a signal corresponding to the operation load can be output from the sensor. As above, according to the operating device, the intermediate part of the operating lever is supported, and with this, the signal corresponding to the operation load can be output from the sensor. Therefore, the number of parts of the operating device can be reduced, and the operating device can be downsized.

In the above invention, the operating device may be configured such that: the operating lever includes a supported portion; the supported portion is formed at the first-direction intermediate part of the operating lever; the supported portion is supported by the casing such that the first end-side part of the operating lever is tiltable in the second and third directions; and bending stiffness of the first end-side part of the operating lever is higher than bending stiffness of the second end-side part of the operating lever.

According to the above configuration, when the first end-side part of the operating lever is operated, the operating lever can be bent at a base point that is the second end-side part. With this, a part of the operating lever which part is located at a first end side of the supported portion can be tilted in the operation direction. On the other hand, a part of the operating lever which part is located at a second end side of the supported portion can be flexed like a spring, be bent by a bent amount corresponding to the operation load, and generate spring force corresponding to the bent amount. With this, without using a reaction force mechanism, operation reaction force corresponding to the tilt angle of the part located at the upper side of the supported portion can be applied to an operator. Further, by flexing the operating lever, the second end-side part of the operating lever presses the sensor, and the spring force acts on the sensor. The spring force changes depending on the operation load, and the part of the operating lever which part is located at the upper side of the supported portion is tilted at the tilt angle corresponding to the operation load. Therefore, by operating and tilting the operating lever, the signal corresponding to the tilt angle can be output from the sensor. As above, since the operating device can output the signal in accordance with the tilt angle by a simple configuration, the number of parts of the operating device can be reduced, and the operating device can be downsized.

In the above invention, the operating device may be configured such that the operating lever includes a bent portion; and the bent portion is formed at a second end side of the supported portion such that the operating lever is bendable in the second and third directions at a base point that is the bent portion.

According to the above configuration, when the first end-side part of the operating lever is operated, the operating lever can be bent at the bent portion. With this, the part of the operating lever which part is located at the first end side of the supported portion can be tilted in the operation direction. On the other hand, the part of the operating lever which part is located at the second end side of the supported portion can be flexed like a spring, be bent by a bent amount corresponding to the operation load, and generate spring force corresponding to the bent amount. With this, without using a reaction force mechanism, operation reaction force corresponding to the tilt angle of the part located at the upper side of the supported portion can be applied to an operator. Further, by flexing the operating lever at the bent portion, the second end-side part of the operating lever presses the sensor, and the spring force acts on the sensor. The spring force changes depending on the operation load, and the part of the operating lever which part is located at the upper side of the supported portion is tilted at the tilt angle corresponding to the operation load. Therefore, by operating and tilting the operating lever, the signal corresponding to the tilt angle can be output from the sensor. As above, since the operating device can output the signal in accordance with the tilt angle by a simple configuration, the number of parts of the operating device can be reduced, and the operating device can be downsized.

In the above invention, the operating device may further include a reaction force adding member arranged close to an outer peripheral surface of the operating lever so as to surround the outer peripheral surface of the operating lever, wherein the reaction force adding member may be arranged such that when the operating lever is tilted, the reaction force adding member applies elastic returning force to the operating lever so as to return the operating lever to a neutral position.

According to the above configuration, in addition to the operation reaction force generated by the bent portion, the operation reaction force generated by the reaction force adding member can be applied to the operating lever. To be specific, only by adding the reaction force adding member, the magnitude of the operation reaction force can be adjusted. Thus, the operating device capable of adjusting the operation reaction force by a simple configuration can be configured. With this, the number of parts of the operating device can be prevented from increasing, and the operating device can be downsized.

In the above invention, the operating device may be configured such that: the operating lever includes first to fourth load transfer plates at the second end-side part; the first and second load transfer plates are located between the first and second sensors so as to be spaced part from each other in the second direction and are arranged close to the first and second sensors, respectively; and the third and fourth load transfer plates are located between the third and fourth sensors so as to be spaced apart from each other in the third direction and are arranged close to the third and fourth sensors, respectively.

According to the above configuration, when the operating lever is tilted, the load transfer plate can be flexed. Therefore, the part of the operating lever which part is located at the upper side of the supported portion can be tilted in the operation direction. On the other hand, by flexing the load transfer plate like a spring, the spring force corresponding to the operation load can be generated at the load transfer plate. With this, without using the reaction force mechanism, the operation reaction force corresponding to the tilt angle of the part located at the upper side of the supported portion can be applied to the operator. Further, according to the operating lever, by flexing the load transfer plate, the spring force of the load transfer plate can be made to act on the sensor. The spring force changes depending on the operation load, and the part of the operating lever which part is located at the upper side of the supported portion is tilted at the tilt angle corresponding to the operation load. Therefore, by operating and tilting the operating lever, the signal corresponding to the tilt angle can be output from the sensor. As above, since the operating device can output the signal in accordance with the tilt angle by a simple configuration, the number of parts of the operating device can be reduced, and the operating device can be downsized.

In the above invention, the operating device may be configured such that: the supported portion is formed in a spherical shape; the casing supports the supported portion such that the supported portion is rollable; the first to fourth load transfer plates are arranged at four sides; the third and fourth load transfer plates are arranged so as to be spaced apart from the first and second load transfer plates in the second direction; and the first and second load transfer plates are arranged so as to be spaced apart from the third and fourth load transfer plates in the third direction.

According to the above configuration, it is possible to prevent a case where when the operating lever is tilted in a direction other than the second and third directions, the adjacent load transfer plates contact each other. Therefore, the operation direction of the operating lever is prevented from being restricted, and the operating lever can be operated in all directions perpendicular to the first direction.

In the above invention, the operating device may be configured such that: the operating lever includes a load transfer portion at the second end-side part; the load transfer portion includes four side surfaces facing both sides in the second direction and both sides in the third direction, respectively; and the first to fourth sensors are arranged so as to surround and contact the respective four side surfaces of the load transfer portion.

According to the above configuration, four sensors are arranged so as to surround the load transfer portion, and the sensors contact the respective side surfaces of the load transfer portion. Therefore, the side surface of the load transfer portion hardly deforms when pressing the sensor. Thus, the signal corresponding to the operation load can be output with a high degree of accuracy.

In the above invention, the operating device may be configured such that: the operating lever includes a load transfer portion at the second end-side part; and the load transfer portion is formed in a spherical shape.

According to the above configuration, regardless of the tilt angle of the operating lever, the load transfer portion can contact the sensor at substantially the same position and substantially the same contact area. Therefore, the change of the base point of the flexing of the operating lever by the tilt of the operating lever can be suppressed.

In the above invention, the operating device may be configured such that: the operating lever includes a load transfer portion at the second end-side part; the load transfer portion includes four surfaces opposing the respective first to fourth sensors; and the four surfaces curve so as to form a columnar shape and project toward the respective sensors.

According to the above configuration, regardless of the tilt angle of the operating lever, the load transfer portion can contact the sensor at substantially the same position and substantially the same contact area. Therefore, the change of the base point of the flexing of the operating lever by the tilt of the operating lever can be suppressed.

Advantageous Effects of Invention

According to the present invention, downsizing can be realized.

The above object, other objects, features, and advantages of the present invention will be made clear by the following detailed explanation of preferred embodiments with reference to the attached drawings.

DESCRIPTION OF EMBODIMENTS

Figure 1:
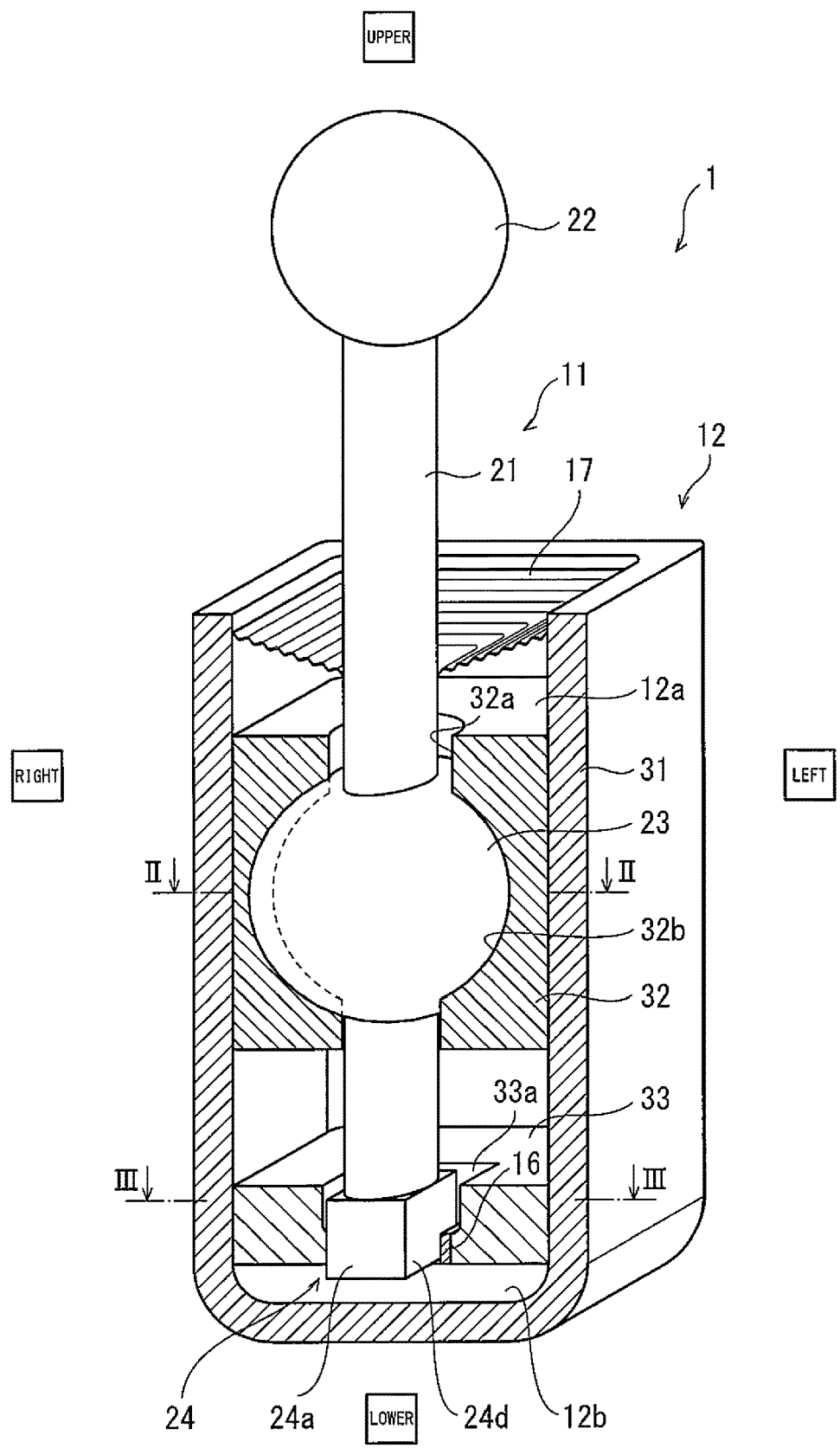
FIG. 1 is a cross-sectional perspective view showing an operating device according to Embodiment 1 of the present invention.
Figure 2:
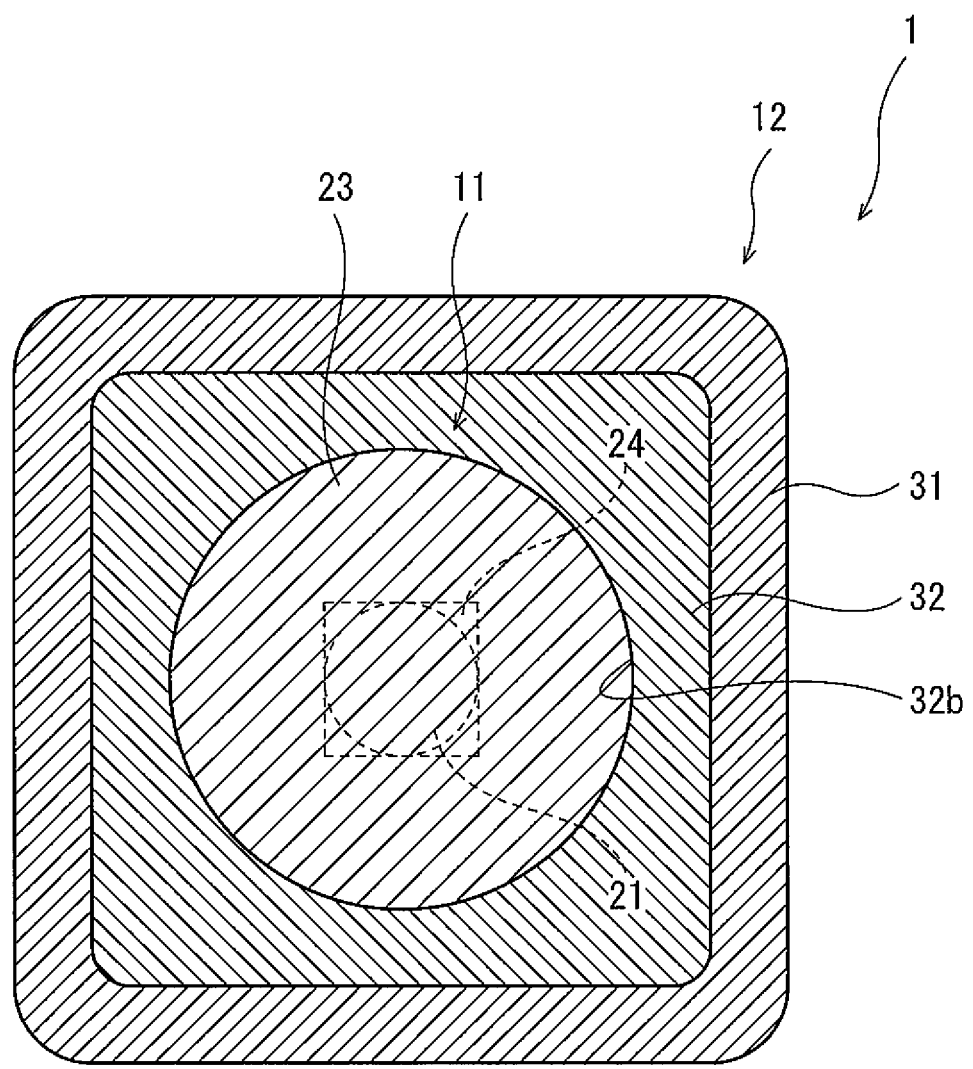
FIG. 2 is a cross-sectional plan view taken along line II-II of FIG. 1.

Hereinafter, operating devices 1 and 1A to 1C of Embodiments 1 to 4 according to the present invention will be explained with reference to the drawings. It should be noted that directions stated in the following explanations are used for convenience of explanation, and directions and the like of components of the present invention are not limited. Further, each of the operating devices 1 and 1A to 1C explained below is just one embodiment of the present invention. Therefore, the present invention is not limited to the embodiments, and additions, deletions, and modifications may be made within the scope of the present invention.

Each of various machines, such as construction machines, aircrafts, and game devices, includes an operating device 1, 1A, 1B, or 1C, and an operator can input various commands to the machine through the operating device 1, 1A, 1B, or 1C. The operating device 1, 1A, 1B, or 1C is used to operate, for example, an actuator of a construction machine and is configured to be able to operate two different actuators by tilting operations in a front-rear direction and a left-right direction. To be specific, each of the operating devices 1 and 1A to 1C is configured to be able to output output signals that are different from one another in accordance with tilt directions. It should be noted that each of the operating devices 1 and 1A to 1C is applicable to various machines, such as aircrafts and game devices in addition to the above construction machines. Hereinafter, various specific examples of the configuration of the operating device 1, 1A, 1B, or 1C will be explained with reference to the drawings.

Embodiment 1

The operating device 1 of Embodiment 1 includes an operating lever 11, a casing 12, and four sensors 13 to 16. The operating lever 11 is a substantially columnar member that is solid or hollow and extends in a first direction, i.e., an upper-lower direction in the present embodiment. The operating lever 11 includes a main body portion 21 made of a metal material, such as iron. An operating portion 22 is provided at an upper end part that is a first end part of the main body portion 21. The operating portion 22 is made of synthetic resin, synthetic rubber, or the like and is formed in a substantially spherical shape. It should be noted that the operating portion 22 does not necessarily have to have a spherical shape and may be a cylindrical shape or an inverted conical shape that tapers downward. The operating portion 22 having such shape is fitted to the upper end part of the main body portion 21 so as to cover the upper end part. With this, the operator can hold the upper end part of the operating lever 11 so as to wrap the upper end part with the entire hand. Further, the operating lever 11 is inserted into the casing 12 with an upper end-side part thereof projecting from the casing 12, the upper end-side part including the operating portion 22.

The casing 12 includes a casing main body 31, a supporting body 32, and a sensor attaching body 33. The casing main body 31 is formed in a substantially box shape and is fixed to a housing (not shown) of the machine. The casing main body 31 includes therein an accommodating space 12a. The accommodating space 12a is a space extending in the upper-lower direction and having a rectangular shape in a plan view. The accommodating space 12a accommodates the supporting body 32.

The supporting body 32 is formed in a substantially rectangular parallelepiped shape and includes a through hole 32a penetrating in the upper-lower direction. An upper-lower direction intermediate part of the operating lever 11 is inserted into the through hole 32a. The operating lever 11 includes a supported portion 23 at the intermediate part thereof. The supported portion 23 is formed in a substantially spherical shape. A radius of the supported portion 23 is larger than a radius of the other part of the operating lever 11. The through hole 32a includes a supported portion accommodating space 32b accommodating the supported portion 23. The supported portion accommodating space 32b is formed in a spherical shape that is substantially equal in diameter to the supported portion 23. With this, the supported portion 23 is fitted in the supported portion accommodating space 32b, and the operating lever 11 is fixed by the supporting body 32 so as not to move in the upper-lower, front-rear, and left-right directions. In the supporting body 32, a diameter of the through hole 32a is larger than an outer diameter of the operating lever 11. When the operating portion 22 of the operating lever 11 is pushed and pulled (i.e., operated) in directions perpendicular to the upper-lower direction, the operating lever 11 can be slightly tilted in all directions perpendicular to the upper-lower direction at a fulcrum that is the supported portion 23. The supporting body 32 configured as above is arranged in the accommodating space 12a so as to be upwardly away from a bottom portion 12b of the casing 12. The sensor attaching body 33 is arranged between the bottom portion 12b and the supporting body 32.

Figure 3:
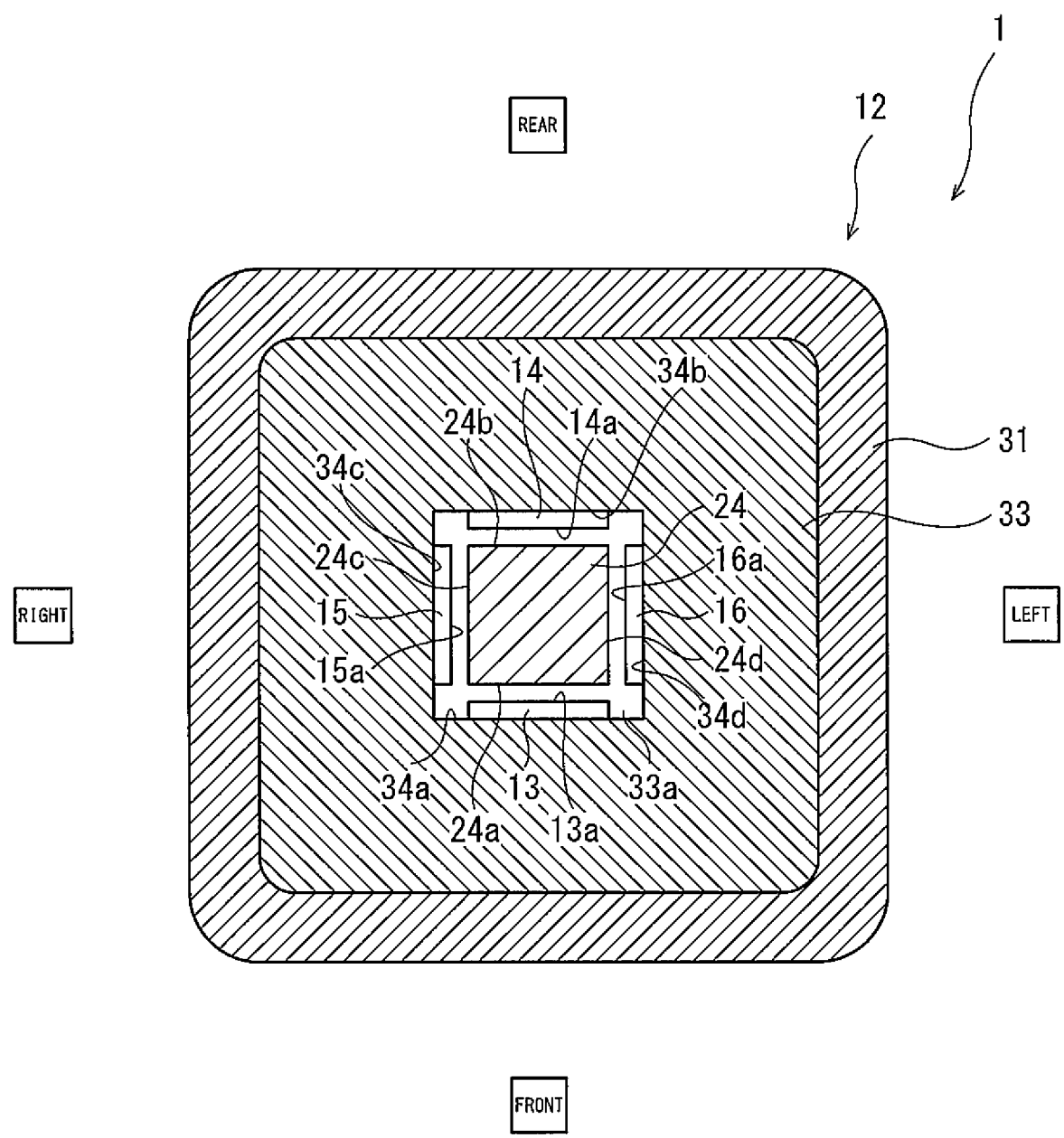
FIG. 3 is a cross-sectional plan view taken along line III-III of FIG. 1.

The sensor attaching body 33 is a member to which four sensors 13 to 16 explained below in detail are attached. The sensor attaching body 33 is arranged under the supporting body 32. The sensor attaching body 33 includes an attachment hole 33a in the vicinity of a center thereof in a plan view. As shown in FIG. 3, the attachment hole 33a is formed to have a square cross section in a plan view. Therefore, the sensor attaching body 33 includes: first and second inner side surfaces 34a and 34b opposed to each other in the front-rear direction; and third and fourth inner side surfaces 34c to 34d opposed to each other in the left-right direction. Regarding the first to fourth inner side surfaces 34a to 34d, respective parts located close to the supporting body 32 are cut out and are therefore concave outward. With this, regarding the first to fourth inner side surfaces 34a to 34d, respective parts located close to the bottom portion 12b project inward with respect to the above parts located close to the supporting body 32, and the sensors 13 to 16 are attached to the respective parts located close to the bottom portion 12b.

The sensors 13 to 16 detect loads. When loads act on sensor surfaces 13a to 16a of the sensors 13 to 16, the sensors 13 to 16 output signals in accordance with the magnitude of the acting loads. Each of the sensors 13 to 16 is, for example, a piezoelectric sensor formed in a substantially rectangular film shape in a side view. It should be noted that for convenience of explanation, the sensors 13 to 16 that are thickened are shown in FIG. 3. The sensors 13 to 16 each having such shape are attached to the respective inner side surfaces 34a to 34d so as to be opposed to one another.

More specifically, the first and second sensors 13 and 14 are attached to the first and second inner side surfaces 34a and 34b, respectively, and are arranged so as to be opposed to and spaced apart from each other in the front-rear direction. The third and fourth sensors 15 and 16 are attached to the third and fourth inner side surfaces 34c and 34d, respectively, and are arranged so as to be opposed to and spaced apart from each other in the left-right direction. As above, the four sensors 13 to 16 are arranged at the respective inward projecting parts of the first to fourth inner side surfaces 34a to 34d so as to be spaced apart from one another in the front-rear and left-right directions. A lower end-side part of the operating lever 11 is inserted among the four sensors 13 to 16. The operating lever 11 includes a load transfer portion 24 at the lower end-side part thereof.

The load transfer portion 24 is formed in a substantially rectangular parallelepiped shape that is solid or hollow. The load transfer portion 24 itself does not elastically deform. The load transfer portion 24 is inserted into the attachment hole 33a. In a plan view, an outer shape of the load transfer portion 24 is smaller than an outer shape of the attachment hole 33a. Therefore, the load transfer portion 24 is arranged such that four side surfaces 24a to 24d thereof and the sensors 13 to 16 opposed to the respective side surfaces 24a to 24d are adjacently located. In the present embodiment, the load transfer portion 24 is arranged in a space surrounded by the four sensors 13 to 16, i.e., in the attachment hole 33a such that a predetermined gap is formed between the opposing surfaces. The gap (play) between the side surface (24a to 24d) and the opposing sensor (13 to 16) is, for example, about 0.01 to 5 mm. It should be noted that the gap between the side surface (24a to 24d) and the opposing sensor (13 to 16) does not necessarily have to be formed, and the side surface (24a to 24d) and the opposing sensor (13 to 16) may contact each other. As above, the load transfer portion 24 at the lower end-side part of the operating lever 11 is inserted into the attachment hole 33a and is surrounded by and arranged adjacent to the four sensors 13 to 16 arranged at four sides.

As described above, the operating lever 11 is inserted into the casing 12, and the supported portion 23 at the intermediate part of the operating lever 11 is supported by the supporting body 32. The upper end-side part of the operating lever 11 projects outward from the accommodating space 12a of the casing 12, and the operating lever 11 includes the operating portion 22 at the upper end part thereof. A cover 17 is provided between the upper end part of the operating lever 11 and the supported portion 23. The cover 17 is provided at an outer peripheral surface of the operating lever 11 over the entire periphery in the circumferential direction and interposed between the outer peripheral surface of the operating lever 11 and an inner peripheral surface of the casing 12 to close the accommodating space 12a.

According to the operating device 1 configured as above, when the operating portion 22 of the operating lever 11 is operated, the operating lever 11 moves based on the principle of leverage at a fulcrum that is the supported portion 23. After the load transfer portion 24 moves by a distance corresponding to the play, the load transfer portion 24 presses any of the sensors 13 to 16. More specifically, when the operating lever 11 is operated, the load transfer portion 24 starts moving toward the corresponding sensor (13 to 16) located in a direction opposite to a direction in which the operating lever 11 is operated. After the load transfer portion 24 moves by a distance corresponding to the play, the load transfer portion 24 contacts the corresponding sensor (13 to 16). In order to further tilt the operating lever 11 from this state, a part of the operating lever 11 which part is located between the load transfer portion 24 and the supported portion 23 needs to be flexed by applying to the operating lever 11 an operation load corresponding to the tilt angle. When the operating lever 11 is flexed, reaction force corresponding to the flexed amount is generated, and the above-described corresponding sensor (13 to 16) is pressed by the reaction force (i.e., pressing load). As above, when the operating lever 11 is tilted, the pressing load proportional to the operation load acts on the sensor (13 to 16). With this, the pressed sensor (13 to 16) outputs a signal having magnitude corresponding to the pressing load.

For example, when the operating portion 22 is operated in the rear direction, the first sensor 13 is pressed, and the first sensor 13 outputs a signal having magnitude corresponding to the operation load. Further, when the operating portion 22 is operated in the left direction, the third sensor 15 is pressed, and the third sensor 15 outputs a signal having magnitude corresponding to the operation load. When the operating portion 22 is operated in a front and diagonally-right direction, the second and fourth sensors 14 and 16 are pressed. Thus, the second sensor 14 outputs an output signal having magnitude corresponding to a component (front component) of the operation load, and the fourth sensor 16 outputs an output signal having magnitude corresponding to a component (right component) of the operation load.

When the operating lever 11 is tilted, a part of the load transfer portion 24 which part is located close to the bottom portion 12b moves more largely than a part of the load transfer portion 24 which part is located close to the supporting body 32. Therefore, the part of the load transfer portion 24 which part is located close to the bottom portion 12b first contacts the sensor (13 to 16). After that, the part of the operating lever 11 which part is located between the load transfer portion 24 and the supported portion 23 is flexed, and with this, a contact portion between the load transfer portion 24 and the sensor 13 shifts from the bottom portion 12b side to the supporting body 32 side. In this case, variations of the output signal with respect to the angle easily occur, the variations being caused due to individual differences, such as size variations of components.

In consideration of this, in the operating device 1, the parts of the side surfaces 34a to 34d of the sensor attaching body 33 which parts are located close to the supporting body 32 are cut out, and the parts of the side surfaces 34a to 34d of the sensor attaching body 33 which parts are located close to the bottom portion 12b project inward. With this, even when the operating lever 11 is tilted, the part of the load transfer portion 24 which part is located close to the supporting body 32 does not contact the side surfaces 34a to 34d, and the part of the load transfer portion 24 which part is located close to the bottom portion 12b mainly contacts the side surfaces 34a to 34d.

An outer size of a sensor surface of each of the sensors 13 to 16 is made smaller than an outer size of each of the side surfaces 24a to 24d of the load transfer portion 24. More specifically, a length of the sensor surface in the upper-lower direction is made shorter than a length of each of the side surfaces 24a to 24d in the upper-lower direction. With this, a portion range where the load transfer portion 24 contacts each of the sensors 13 to 16 can be narrowed. With this, a change of a base point when the operating lever 11 is tilted can be made small. Thus, the tilt angle of the operating lever 11 can be more accurately detected, and the variations of the output signal with respect to the angle due to the individual differences can be reduced.

As above, according to the operating device 1, since the supported portion 23 having a spherical shape is supported by the supporting body 32, the operating lever 11 can be operated in all directions perpendicular to the upper-lower direction and output a signal in accordance with an operation direction of the operating lever 11. According to prior art, in order to output the output signal having magnitude corresponding to the tilt angle corresponding to the operation load, a universal joint, a reaction force mechanism configured to generate operation reaction force, and a gimbal are used. On the other hand, according to the operating device 1, when the operating lever 11 is operated, the output signal having magnitude corresponding to the operation load is output from the sensor (13 to 16) located in a direction opposite to the operation direction of the operating lever 11. As above, according to the operating device 1, the output signal having magnitude corresponding to the operation load can be output without using the universal joint, the reaction force mechanism configured to generate the operation reaction force, and the gimbal which are used in the electric operating device of the prior art. With this, the number of parts of the operating device 1 can be reduced, and the operating device 1 can be downsized. Further, since an angle sensor is not used, restrictions during assembling can be eased, and therefore, the operating device 1 can be easily assembled. Examples of the restrictions during assembling are as follows: a rotational center of the angle sensor needs to accurately coincide with a rotational center of the gimbal; and the angle sensor needs to be attached without causing angular displacement.

Embodiment 2

The operating device 1A of Embodiment 2 is similar in configuration to the operating device 1 of Embodiment 1. Therefore, in the following explanation, components of the operating device 1A of Embodiment 2 which are different from the components of the operating device 1 of Embodiment 1 will be mainly explained. The same reference signs are used for the same components, and a repetition of the same explanation is avoided. The same is true for the operating devices 1B and 1C of Embodiments 3 and 4.

Figure 4:
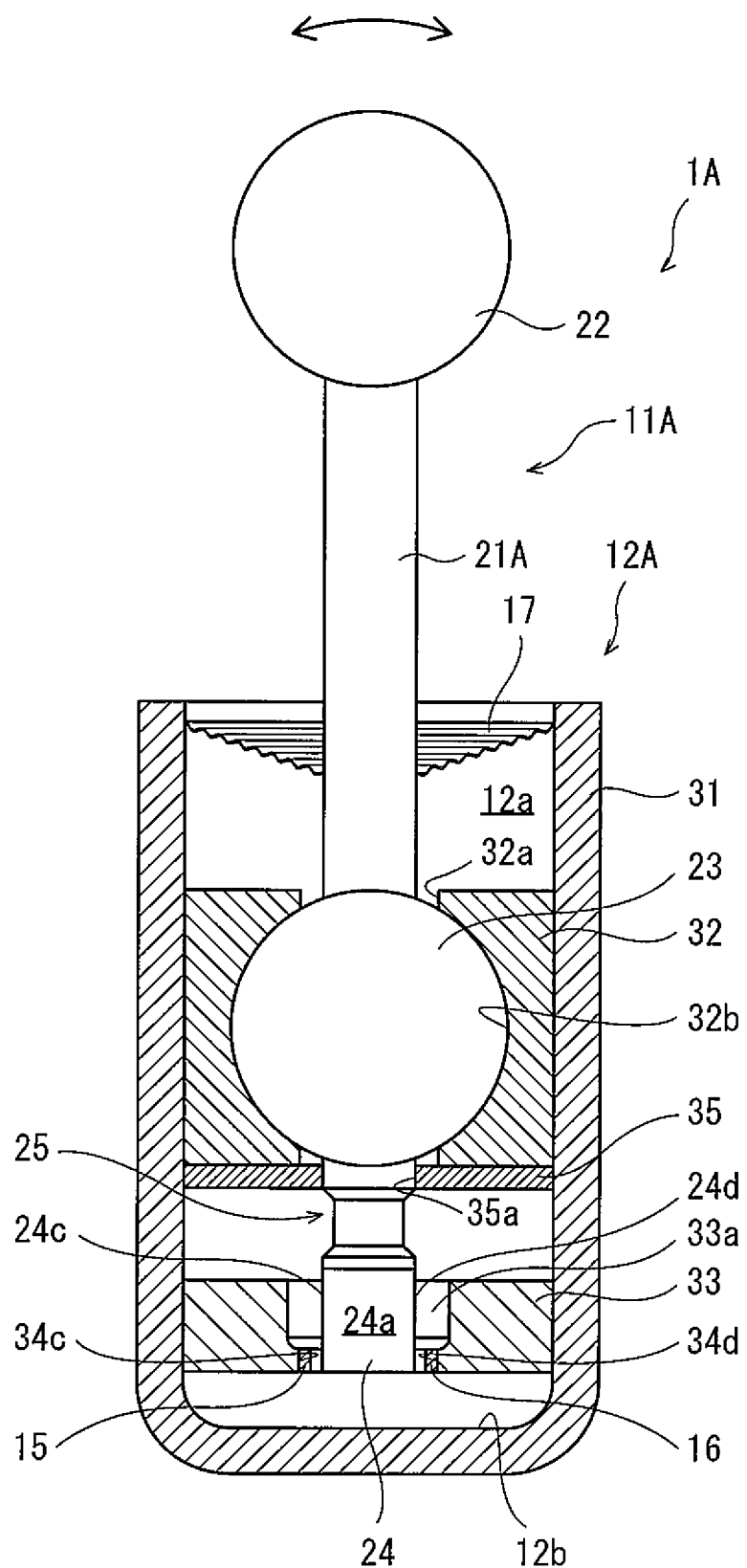
FIG. 4 is a cross-sectional front view showing the operating device according to Embodiment 2 of the present invention.

As shown in FIG. 4, the operating device 1A of Embodiment 2 includes an operating lever 11A, a casing 12A, and four sensors 13 to 16. The operating lever 11A includes a main body portion 21A, the operating portion 22, and the supported portion 23. The main body portion 21A is a substantially columnar member that is solid or hollow and extends in the upper-lower direction. The operating portion 22 is provided at an upper end part of the main body portion 21A. The main body portion 21A includes the load transfer portion 24 at a lower end part thereof, and the supported portion 23 at an intermediate part thereof.

A part of the main body portion 21A which part is located at an upper side of the supported portion 23 and a part of the main body portion 21A which part is located at a lower side of the supported portion 23 are made of different materials, and bending stiffness of the part located at the upper side of the supported portion 23 (i.e., bending stiffness of a first end-side part in the first direction) is higher than bending stiffness of the part located at the lower side of the supported portion 23 (i.e., bending stiffness of a second end-side part in the first direction). In the present embodiment, the part located at the upper side of the supported portion 23 is made of a metal material, such as iron, and the part located at the lower side of the supported portion 23 is made of a synthetic resin material, such as CFRP. By making the bending stiffnesses different from each other, the elastic deformation of the part located at the lower side of the supported portion 23 occurs more easily than the elastic deformation of the part located at the upper side of the supported portion 23. It should be noted that the materials constituting the above parts are not limited to the above materials. Further, the main body portion 21A includes a bent portion 25 at the part located at the lower side of the supported portion 23, more specifically, between the supported portion 23 and the load transfer portion 24.

Figure 5:
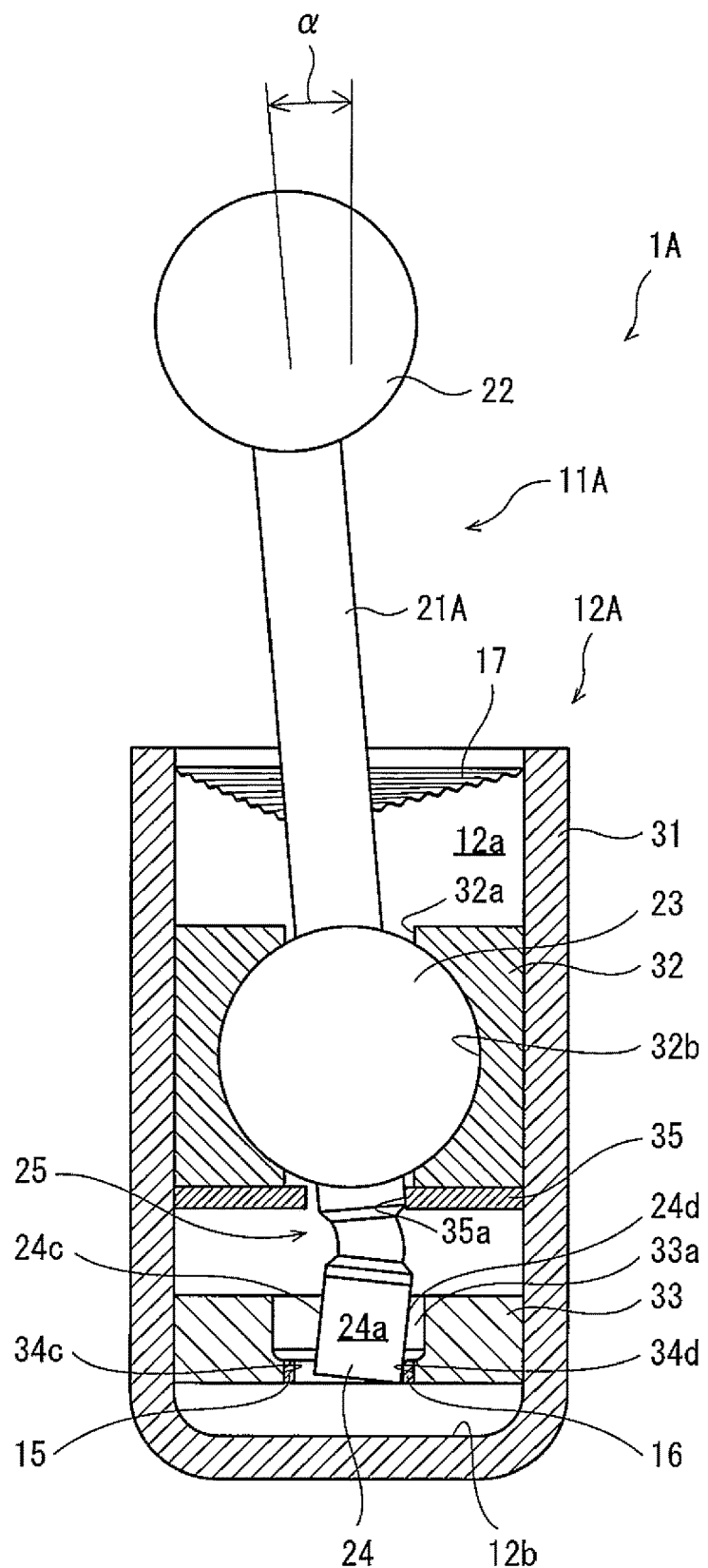
FIG. 5 is a cross-sectional front view showing that an operating lever of the operating device of FIG. 4 is tilted.

The bent portion 25 is a so-called constriction and is configured by forming a groove having a substantially constant depth at the main body portion 21A over the entire periphery in the circumferential direction. The bent portion 25 is smaller in diameter than the other part of the main body portion 21A. The main body portion 21A can be bent at a base point that is the bent portion 25 in all directions perpendicular to the upper-lower direction. To be specific, as shown in FIG. 5, when the operating portion 22 is operated in a predetermined direction, the operating lever 11A can be bent at the bent portion 25. With this, the part located at the upper side of the supported portion 23 can be tilted at a fulcrum that is the supported portion 23.

By forming the bent portion 25 at the main body portion 21A, the operating lever 11A can be bent and flexed so as to be elastically deformed. The operating lever 11A can be bent at a bent amount corresponding to the operation load and further can generate spring force corresponding to the bent amount. Therefore, without using the reaction force mechanism constituted by the cam, the push rod, and the spring as described in PTL 1, the operation reaction force corresponding to a tilt angle α of the part located at the upper side of the supported portion 23 can be applied to the operator, and the operating lever 11A can be returned to a neutral position.

Instead of forming the bent portion 25, from the viewpoint of making the bending stiffnesses different by a shape, the main body portion 21A may have such a shape that in terms of bending, the second moment of area of the part located at the upper side of the supported portion 23 becomes larger than the second moment of area of the part located at the lower side of the supported portion 23. For example, the main body portion 21A may be such a substantially columnar member that an outer diameter of the part located at the upper side of the supported portion 23 is larger than an outer diameter of the part located at the lower side of the supported portion 23.

Further, according to the operating lever 11A, by flexing the bent portion 25, the load transfer portion 24 presses the corresponding sensor (13 to 16), and the spring force acts on the corresponding sensor (13 to 16). The spring force changes depending on the operation load, and the part of the operating lever 11A which part is located at the upper side of the supported portion 23 is tilted at the tilt angle α corresponding to the operation load. Therefore, by operating and tilting the operating lever 11A, the signal corresponding to the tilt angle α can be output from the sensor. As above, since the operating device 1 can output the signal in accordance with the tilt angle α by a simple structure, the number of parts of the operating device 1A can be reduced, and the operating device 1A can be downsized.

According to the operating lever 11A, since the bent portion 25 is formed at a lower part of the main body portion 21A, the bending stiffness of the lower part is low. Further, the lower part at which the bent portion 25 is formed is made of a material having low bending stiffness. Therefore, the lower part of the main body portion 21A can be bent, and it is possible to suppress uncomfortable feeling felt in a case where when the operator operates the operating lever 11A, the upper part of the main body portion 21A is bent, and the operating lever 11A is flexed. With this, the operating device 1A can be tilted without using components, such as a universal joint. Thus, the number of parts of the operating device 1A can be reduced, and the operating device 1A can be downsized.

Figure 6:
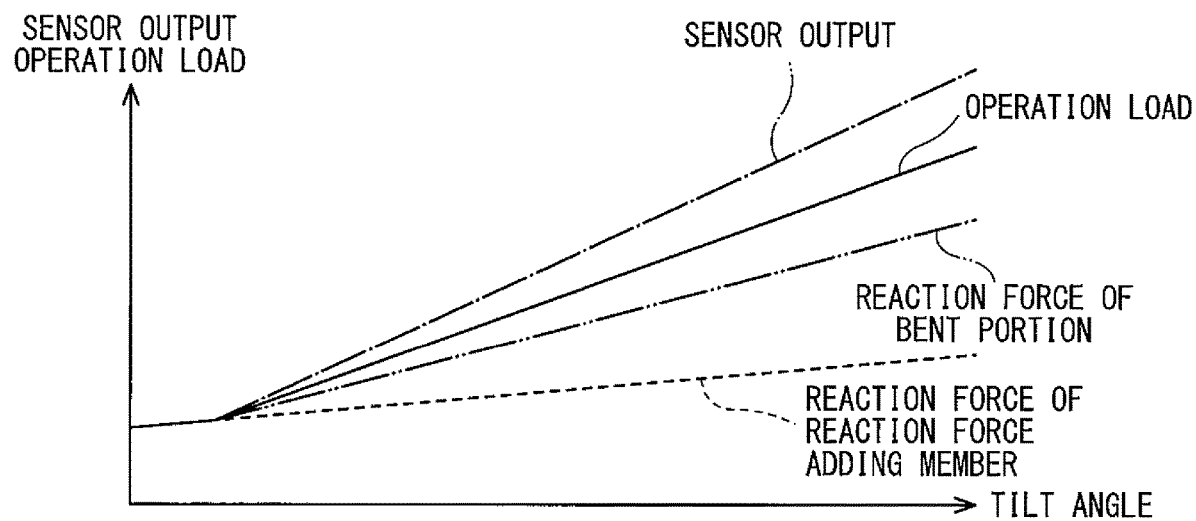
FIG. 6 is a graph showing a relation between a tilt angle of the operating lever and an operation load.

Further, according to the operating device 1A, a reaction force adding member 35 is accommodated in the casing main body 31. The reaction force adding member 35 is a plate-shaped elastic body made of, for example, synthetic rubber, and an insertion hole 35a is formed in the vicinity of a center of the reaction force adding member 35 in a plan view. The main body portion 21A is inserted into the insertion hole 35a, and the insertion hole 35a is located between the supported portion 23 and the bent portion 25 of the main body portion 21A. An inner peripheral surface of the reaction force adding member 35 is located close to an outer peripheral surface of the main body portion 21A. When the operating portion 22 is operated, and the upper part of the main body portion 21A is tilted, the insertion hole 35a is pushed and widened by the lower part of the main body portion 21A. At this time, the reaction force adding member 35 generates elastic returning force so as to return to an original shape and applies the elastic returning force to the main body portion 21A to return the operating lever 11A to the neutral position. With this, as the operation reaction force that is force acting against the operation load (see a solid line in FIG. 6) generated when the operating portion 22 is operated, the elastic returning force (see a dotted line in FIG. 6) from the reaction force adding member 35 can be made to act on the operating portion 22 in addition to elastic reaction force (see a two-dot chain line in FIG. 6) generated by bending the main body portion 21A. To be specific, the operation reaction force can be increased by the reaction force adding member 35.

It should be noted that since the elastic returning force of the reaction force adding member 35 can be changed by changing the material and shape (such as thickness) of the reaction force adding member 35, desired operation reaction force can be obtained by changing the material and shape (such as thickness) of the reaction force adding member 35. Further, the operation reaction force only in a predetermined direction can be increased by changing the shape of the reaction force adding member 35. To be specific, according to the operating device 1A, the operation reaction force can be changed only by changing the reaction force adding member 35, i.e., the operational feeling can be changed only by changing the reaction force adding member 35.

As above, according to the operating device 1A, in addition to the operation reaction force generated by the bent portion 25, the operation reaction force generated by the reaction force adding member 35 can be applied to the operating lever 11A. Further, the magnitude of the operation reaction force can be adjusted by changing, for example, the shape of the reaction force adding member 35. With this, the operating device 1A capable of adjusting the operation reaction force by a simple structure can be configured. Therefore, the number of parts of the operating device 1A can be prevented from increasing, and the operating device can be downsized.

In addition to the above-described operational advantages, the operating device 1A of Embodiment 2 configured as above has the same operational advantages as the operating device 1 of Embodiment 1.

Embodiment 3

Figure 7:
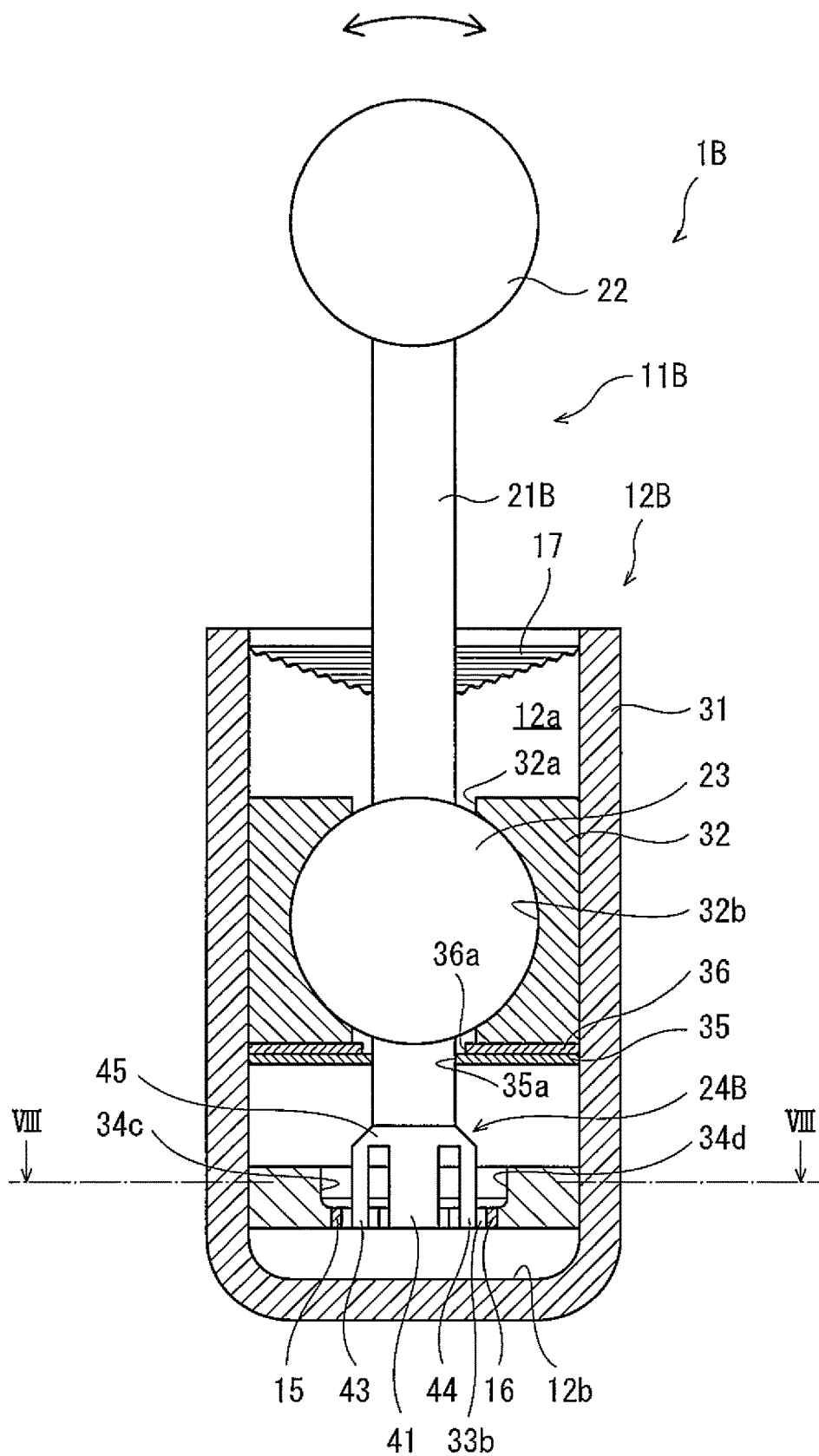
FIG. 7 is a cross-sectional front view showing the operating device according to Embodiment 3 of the present invention.

As shown in FIG. 7, the operating device 1B of Embodiment 3 includes an operating lever 11B, a casing 12B, and four sensors 13 to 16. The operating lever 11B includes a main body portion 21B, the operating portion 22, and the supported portion 23. The main body portion 21B is a substantially columnar member that is solid or hollow and extends in the upper-lower direction. As with Embodiment 2, the bending stiffness of the part of the main body portion 21B which part is located at the upper side of the supported portion 23 is higher than the bending stiffness of the part of the main body portion 21B which part is located at the lower side of the supported portion 23. The main body portion 21B configured as above includes a load transfer portion 24B at a lower end part thereof.

Figure 8:
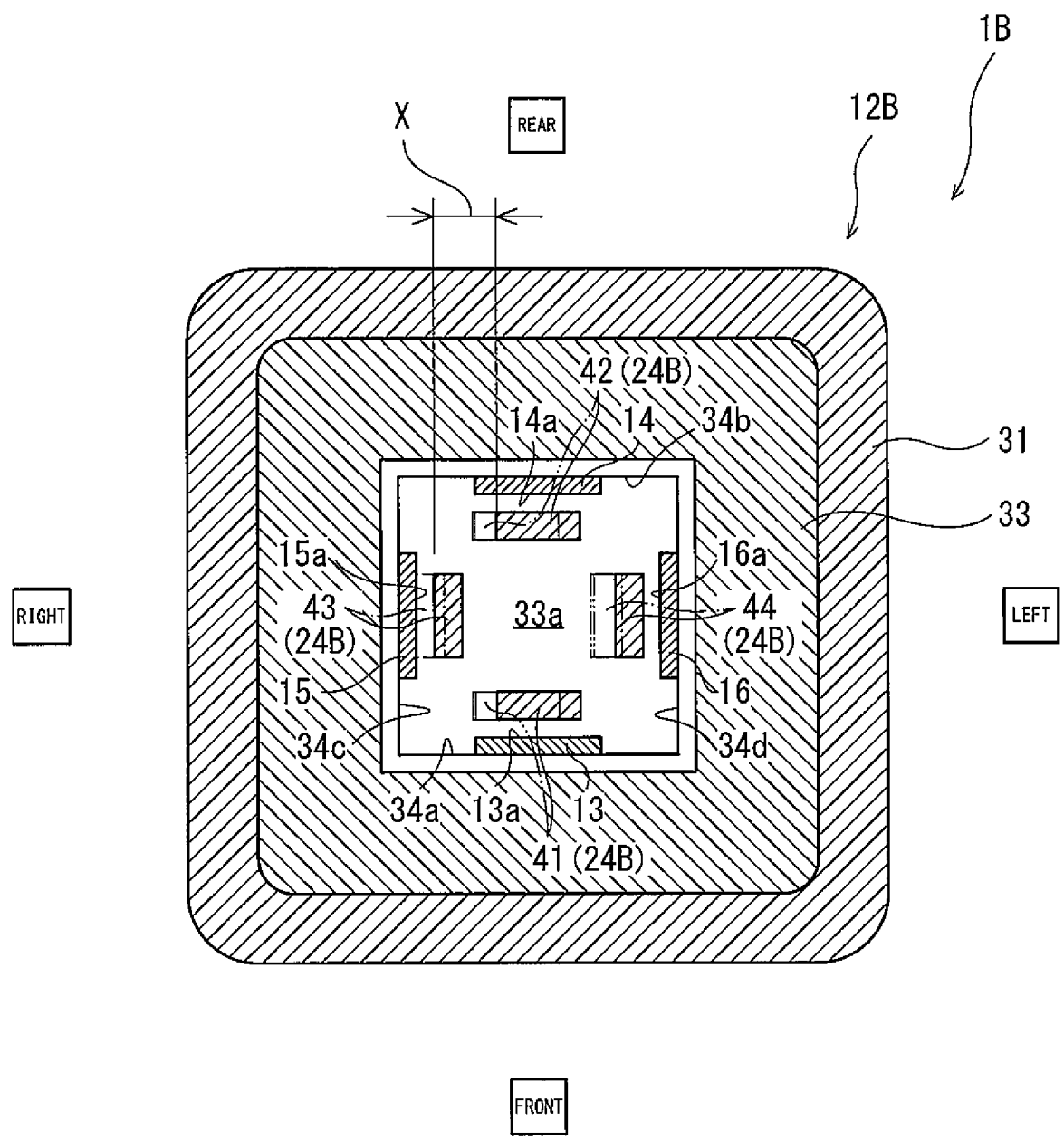
FIG. 8 is a cross-sectional plan view taken along line VIII-VIII of FIG. 7.

As shown in FIG. 8, the load transfer portion 24B includes four load transfer plates 41 to 44, and the four load transfer plates 41 to 44 are arranged at four sides so as to be spaced apart from one another in the front-rear and left-right directions. To be specific, the first and second load transfer plates 41 and 42 are arranged so as to be spaced apart from each other in the front-rear direction, and the third and fourth load transfer plates 43 and 44 are arranged so as to be spaced apart from each other in the left-right direction. Further, the first to fourth load transfer plates 41 to 44 are arranged close to the first to fourth sensors 13 to 16, respectively. The first to fourth load transfer plates 41 to 44 arranged as above are coupled to an intermediate part of the main body portion 21B through a coupling portion 45.

The coupling portion 45 is formed in a substantially square shape in a plan view, and the first to fourth load transfer plates 41 to 44 are integrally provided at respective intermediate parts of sides of the square shape of the coupling portion 45. The load transfer plates 41 to 44 are rectangular plate-shaped members extending downward from the respective sides of the coupling portion 45. The first to fourth inner side surfaces 34a to 34d of a sensor attaching body 33B are arranged close to respective outer surfaces 41a to 41d of the first to fourth load transfer plates 41 to 44. In the present embodiment, the corresponding surfaces are opposed to each other, and a gap (for example, about 0.01 to 5 mm) is formed therebetween. Further, regarding the first to fourth inner side surfaces 34a to 34d, respective parts located close to the supporting body 32 are cut out and are therefore concave outward, and respective parts located close to the bottom portion 12b project inward. The sensors 13 to 16 are attached to these respective projecting parts. Thus, the four sensors 13 to 16 surround the load transfer portion 24B from four sides that are front, rear, left, and right sides.

Figure 9:
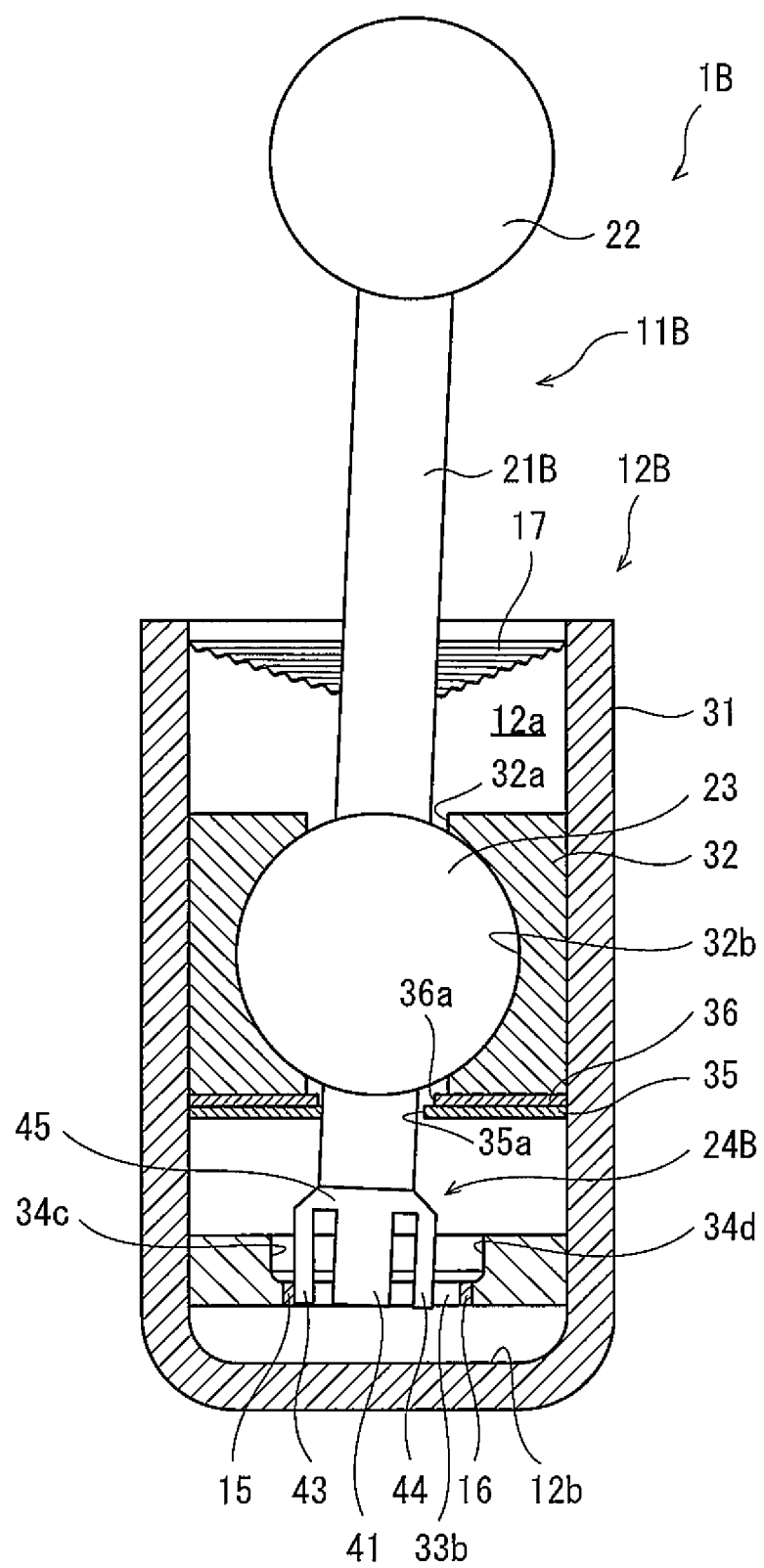
FIG. 9 is a cross-sectional front view showing that the operating lever of the operating device of FIG. 7 is tilted.

When the operating lever 11B is operated with the four sensors 13 to 16 arranged as above, the load transfer portion 24 moves by a distance corresponding to the gap (play), and then the load transfer plate (41 to 44) located in a direction opposite to the tilt direction presses the corresponding sensor (13 to 16). For example, as shown by two-dot chain lines in FIG. 8 and in FIG. 9, when the operating lever 11B is tilted to the right side, the third load transfer plate 43 located at the left side starts moving toward the corresponding third sensor 15. After the third load transfer plate 43 moves by a distance corresponding to the play, the third load transfer plate 43 contacts the third sensor 15. When the operating lever 11B is further tilted from this state, the third load transfer plate 43 is flexed, and in accordance with this, the part of the operating lever 11B which part is located at the upper side of the supported portion 23 is tilted in the operation direction. Further, by flexing the third load transfer plate 43, the spring force corresponding to the operation load can be generated at the third load transfer plate 43. With this, the operation reaction force corresponding to the tilt angle can be applied to the operator without using the reaction force mechanism. Further, according to the operating lever 11B, by flexing the third load transfer plate 43, the spring force of the third load transfer plate 43 can be made to act on the third sensor 15 as the reaction force. The spring force changes depending on the operation load, and the part of the operating lever 11B which part is located at the upper side of the supported portion 23 is tilted at the tilt angle corresponding to the operation load. Therefore, by operating and tilting the operating lever 11B, the signal corresponding to the tilt angle can be output from the sensor. As above, since the operating device 1B can output the signal in accordance with the tilt angle by a simple structure, the number of parts of the operating device 1B can be reduced, and the operating device can be downsized.

Further, according to the operating device 1B, the pressing load that is the reaction force is applied to the sensors 13 to 16 by the inward flexing of the load transfer plates 41 to 44 of the load transfer portion 24B. Therefore, in order to generate larger reaction force by the load transfer plates 41 to 44, the sensors 13 to 16 are arranged close to a part of the load transfer portion 24B which part is located close to the bottom portion 12b, i.e., arranged close to parts of the load transfer plates 41 to 44 which parts are located close to the bottom portion 12b. Further, by flexing the parts of the load transfer plates 41 to 44 which parts are located close to the bottom portion 12b, the coupling portion 45 moves outward by the corresponding distance. Therefore, by forming cutouts at parts of the sensor attaching body 33B which parts are located close to the supporting body 32, the coupling portion 45 is prevented from contacting the first to fourth inner side surfaces 34a to 34d of the sensor attaching body 33B. With this, as with Embodiment 1, it is possible to suppress a case where the contact position where the load transfer plate (41 to 44) and the corresponding sensor (13 to 16) contact each other shifts in accordance with the tilt angle of the operating lever 11B.

Further, according to the operating device 1B, when the operating portion 22 is operated in a direction (such as a front and diagonally-right direction or a rear and diagonally-left direction) other than the front, rear, left, and right directions, two adjacent load transfer plates (41 to 44) are flexed inward (i.e., toward a center of the operating lever 11B). Therefore, the four load transfer plates 41 to 44 are arranged so as to be spaced apart from one another such that when the two adjacent load transfer plates (41 to 44) are flexed, they do not contact each other. To be specific, the load transfer plates 41 to 44 are arranged with gaps X in the front-rear and left-right directions, and each of the gaps X is set such that even when the operating lever 11B is tilted at a maximum tilt angle set for the operating lever 11B, the load transfer plates 41 to 44 do not contact one another. With this, it is possible to prevent a case where when the operating lever 11B is tilted in a direction (such as a front and diagonally-right direction or a rear and diagonally-left direction) other than the front, rear, left, and right directions, the adjacent load transfer plates (41 to 44) contact each other. Therefore, the operation direction of the operating lever 11B is prevented from being restricted, and the operating lever 11B can be operated in all directions perpendicular to the upper-lower direction.

Figure 10:
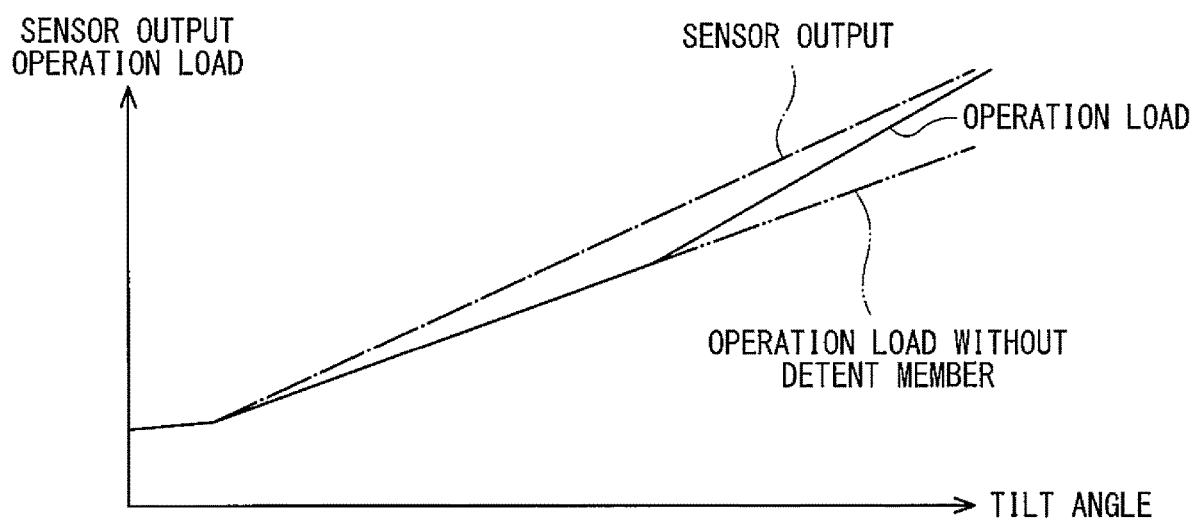
FIG. 10 is a graph showing, for example, a relation between the tilt angle of the operating lever and the operation load.

Further, according to the operating device 1B, in addition to the reaction force adding member 35, a detent member 36 is accommodated in the casing main body 31. The detent member 36 is made of a material that is the same as or different from the material of the reaction force adding member 35. The detent member 36 is formed in a substantially plate shape. The detent member 36 is arranged between the supporting body 32 and the reaction force adding member 35. As with the reaction force adding member 35, an insertion hole 36a is formed in the vicinity of a center of the detent member 36 in a plan view. The insertion hole 36a of the detent member 36 is slightly larger in diameter than the insertion hole 35a of the reaction force adding member 35 and does not contact the operating lever 11B located at the neutral position. On the other hand, when the operating lever 11B is tilted, and the tile angle becomes a predetermined angle, the insertion hole 36a contacts the outer peripheral surface of the operating lever 11B. When the operating lever 11B is further tilted, the insertion hole 36a is pushed and widened and applies the elastic returning force to the operating lever 11B so as to return to an original shape. With this, when the operating lever 11B is tilted at the predetermined angle or more, the elastic returning force of the detent member 36 also acts on the operating lever 11B as the operation reaction force in addition to the elastic returning force of the reaction force adding member 35 (see a graph in FIG. 10). With this, detent feeling can be given when the operating lever 11B is tilted at the predetermined tilt angle.

It should be noted that by changing the shape of the detent member 36 (i.e., the thickness of the detent member 36 and the shape of the insertion hole 36a), the magnitude of the detent feeling can be changed, or the detent feeling can be given only when the operating lever 11B is operated in a predetermined direction. To be specific, according to the operating device 1B, the detent feeling can be changed only by changing the detent member 36.

In addition to the above-described operational advantages, the operating device 1B of Embodiment 3 configured as above has the same operational advantages as the operating device 1 of Embodiment 1.

Embodiment 4

Figure 11:
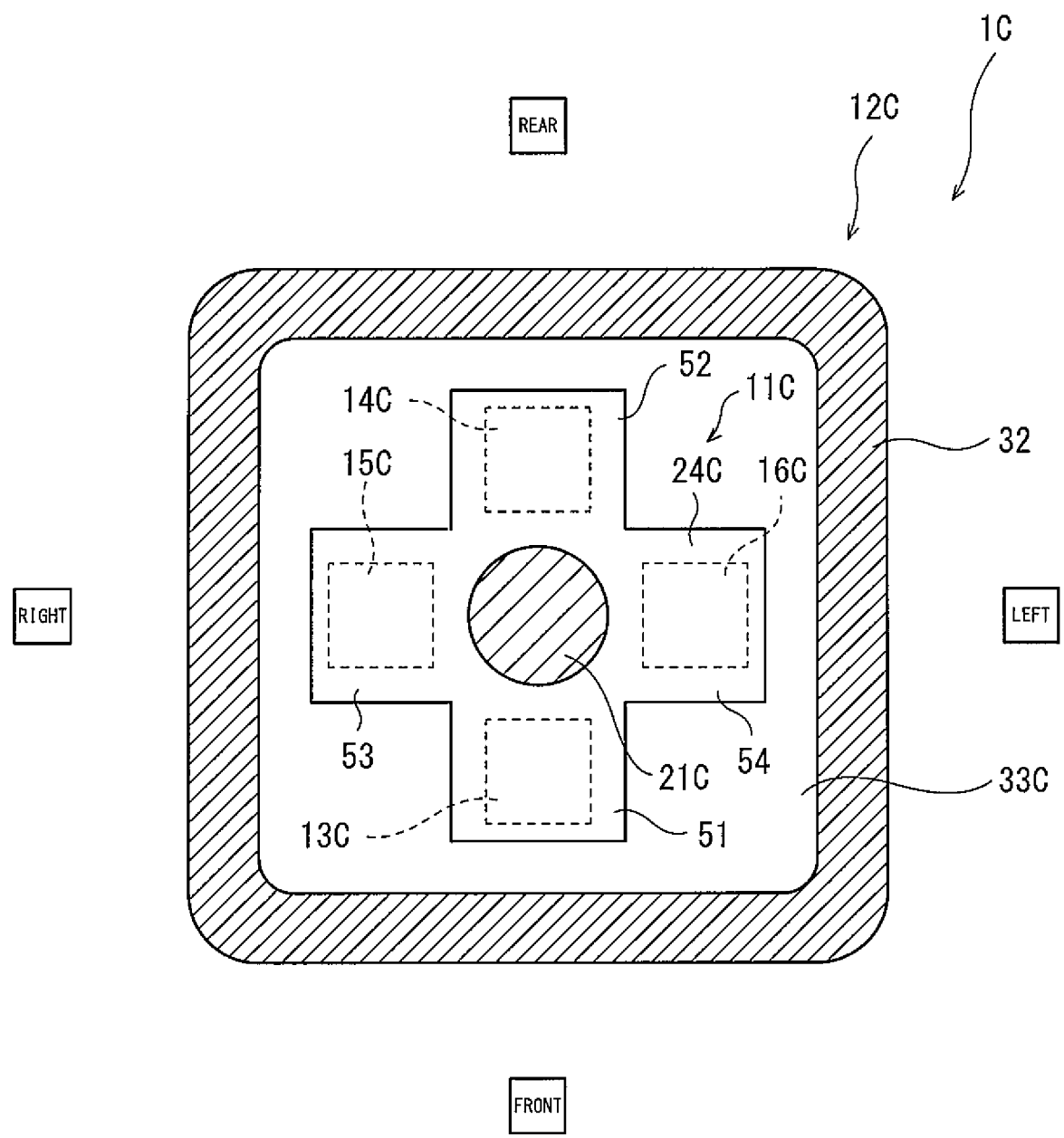
FIG. 11 is a cross-sectional plan view showing the operating device according to Embodiment 4 of the present invention.

The operating device 1C of Embodiment 4 shown in FIG. 11 includes an operating lever 11C, a casing 12C, and four sensors 13C to 16C. The operating lever 11C includes a main body portion 21C, the operating portion 22, and the supported portion 23. The main body portion 21C is a substantially columnar member that is solid or hollow and extends in the upper-lower direction. As with Embodiment 2, the bending stiffness of the part of the main body portion 21C which part is located at the upper side of the supported portion 23 is higher than the bending stiffness of the part of the main body portion 21C which part is located at the lower side of the supported portion 23. The main body portion 21C configured as above includes a load transfer portion 24C at a lower end part thereof.

The load transfer portion 24C is a plate having a cross shape in a plan view and extends in the front-rear and left-right directions. To be specific, the load transfer portion 24C includes a front extending portion 51, a rear extending portion 52, a right extending portion 53, and a left extending portion 54 at front, rear, right, and left sides. The load transfer portion 24C having such shape is arranged such that a lower surface thereof faces a bottom surface of the casing 12C. A sensor attaching body 33C is provided between the load transfer portion 24C and the bottom surface of the casing 12C. The sensor attaching body 33C is a plate member having a substantially rectangular shape in a plan view. The four sensors 13C to 16C are provided at an upper surface of the sensor attaching body 33C.

The four sensors 13C to 16C are arranged at four sides so as to be spaced apart from one another in the front-rear and left-right directions. More specifically, the first sensor 13C is arranged under and close to the front extending portion 51. The second sensor 14C is arranged under and close to the rear extending portion 52. The third sensor 15C is arranged under and close to the right extending portion 53. The fourth sensor 16C is arranged under and close to the left extending portion 54. It should be noted that the sensor (13C to 16C) and the corresponding extending portion (51 to 54) may be arranged with a gap as a play or may be arranged so as to contact each other without a play.

According to the operating device 1C configured as above, when the main body portion 21C is tilted by operating the operating portion 22, the extending portion (51 to 54) located in the same direction as the tilt direction presses the corresponding sensor (13C to 16C). At this time, the extending portion (51 to 54) elastically deforms to be flexed like a spring. With this, the extending portion (51 to 54) can press the corresponding sensor (13C to 16C) with the pressing load corresponding to the tilt angle of the main body portion 21C. Further, since the extending portion (51 to 54) elastically deforms like a spring to be flexed, the operation reaction force corresponding to the tilt amount of the operating lever 11C can be applied to the operating lever 11C without using the reaction force mechanism, and the operating lever 11C can be returned to the neutral position. Thus, the number of parts of the operating device 1C can be reduced, and the operating device 1C can be downsized.

In addition to the above-described operational advantages, the operating device 1C of Embodiment 4 configured as above has the same operational advantages as the operating device 1 of Embodiment 1.

Other Embodiments

According to the operating devices 1 and 1A to 1C of Embodiments 1 to 4, the operating levers 11 and 11A to 11C are configured to be tiltable in all directions perpendicular to the upper-lower direction. However, the operating levers 11 and 11A to 11C do not necessarily have to be configured to be tiltable in all directions perpendicular to the upper-lower direction. For example, the operating levers 11 and 11A to 11C may be tiltable in at least one of the front-rear direction and the left-right direction (i.e., only in the front-rear direction or only in the left-right direction). The directions in which the operating levers 11 and 11A to 11C can be tilted are not limited to the directions perpendicular to the upper-lower direction. The operating levers 11 and 11A to 11C may be configured to be tiltable in directions perpendicular to a predetermined first direction other than the upper-lower direction.

According to the operating devices 1 and 1A of Embodiments 1 and 2, the load transfer portion 24 is formed in a substantially rectangular parallelepiped shape. However, the load transfer portion 24 does not necessarily have to have such shape. For example, the load transfer portion 24 may be formed in a spherical shape, or only a part which contacts the sensors 13 to 16 may be formed in a spherical shape. In this case, regardless of the tilt angle of the operating lever 11, the load transfer portion 24 contacts each of the sensors 13 to 16 at substantially the same position and substantially the same contact area. Therefore, the change of the base point of the flexing of the operating lever 11 by the tilt of the operating lever 11 can be suppressed. Similarly, in the load transfer portion 24, the four side surfaces 24a to 24d opposing the respective four sensors 13 to 16 may curve so as to form a columnar shape and project toward the respective sensors 13 to 16. With this, regardless of the tilt angle of the operating lever 11, the load transfer portion 24 can contact each of the sensors 13 to 16 at substantially the same position and substantially the same contact area.

Further, the operating device 1A of Embodiment 2 is configured such that: the part of the main body portion 21A of the operating lever 11A which part is located at the upper side of the supported portion 23 and the part of the main body portion 21A which part is located at the lower side of the supported portion 23 are made of different materials; the bent portion 25 is formed at the part of the main body portion 21A which part is located at the lower side of the supported portion 23; and the operating lever 11A is bent in the tilt direction. However, the operating lever 11A does not necessarily have to satisfy these two requirements (the above upper and lower parts are made of different materials, and the bent portion 25 is formed). For example, the operating device may be configured such that: the operating lever 11A does not include the bent portion 25; and the upper and lower parts of the main body portion 21A are made of different materials. In contrast, the operating device may be configured such that: the entire main body portion 21A of the operating lever 11A is made of the same material; and the bent portion 25 is formed at the part of the main body portion 21A which part is located at the lower side of the supported portion 23 such that the main body portion 21A is bent at the bent portion 25.

Further, according to the operating device 1B of Embodiment 3, the reaction force applied to the operating lever is generated by flexing the load transfer plates 41 to 44.

However, the operation reaction force may be generated by a different configuration. For example, the operation reaction force may be generated by the part of the main body portion 21B which part is located at the lower side of the supported portion 23 in such a manner that the bending stiffness of the part of the main body portion 21B which part is located at the upper side of the supported portion 23 is set to be higher than the bending stiffness of the part of the main body portion 21B which part is located at the lower side of the supported portion 23.

Further, according to the operating devices 1 and 1A to 1C of Embodiments 1 to 4, a piezoelectric sensor constituted by a piezoelectric element is used as each of the sensors 13 to 16 and 13C to 16C. However, a strain gage sensor, a magnetostrictive sensor, or an electrostatic capacitance sensor may be used instead of the piezoelectric sensor. Further, in the operating devices 1A to 1C of Embodiments 2 to 4, the bending stiffness of the part of the main body portion 21 which part is located at the upper side of the supported portion 23 is higher than the bending stiffness of the part of the main body portion 21 which part is located at the lower side of the supported portion 23. However, this may be reversed. In this case, the part located at the upper side of the supported portion 23 is bent, and this is different from the movement of the conventional operating lever, so that the operational feeling of a user changes. Therefore, in order to obtain the same operational feeling as the conventional operating lever, it is preferable that the bending stiffness of the part located at the upper side of the supported portion 23 be higher than the bending stiffness of the part located at the lower side of the supported portion 23.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the scope of the present invention.

REFERENCE SIGNS LIST 1, 1A to 1C operating device
11, 11A to 11C operating lever
12, 12A to 12C casing
13, 13C first sensor
14, 14C second sensor
15, 15C third sensor
16, 16C fourth sensor
21, 21A to 21C main body portion
23 supported portion
24, 24B, 24C load transfer portion
24a to 24d side surface
25 bent portion
33, 33C sensor attaching body
33a attachment hole
35 reaction force adding member
41 to 44 load transfer plate

The invention claimed is:

1. An operating device comprising:
an operating lever extending in a first direction and including a first end-side part in the first direction, the first end-side part being operable;
a casing supporting a first-direction intermediate part of the operating lever;
first and second sensors arranged in the casing so as to be spaced apart from each other in a second direction perpendicular to the first direction and be adjacent to a second end-side part in the first direction of the operating lever; and
third and fourth sensors arranged in the casing so as to be spaced apart from each other in a third direction perpendicular to the first and second directions and be adjacent to the second end-side part of the operating lever, wherein
each of the first to fourth sensors outputs a signal in accordance with a load applied from the operating lever, and
the operating lever includes a supported portion, the supported portion is formed at the first-direction intermediate part of the operating lever, the supported portion is supported by the casing such that the first end-side part of the operating lever is tiltable in the second and third directions, and bending stiffness of the first end-side part of the operating lever is higher than bending stiffness of the second end-side part of the operating lever.

2. The operating device according to claim 1, wherein:
the operating lever includes a bent portion; and
the bent portion is formed at a second end side of the supported portion such that the operating lever is bendable in the second and third directions at a base point that is the bent portion.

3. The operating device according to claim 2, further comprising a reaction force adding member arranged to surround an outer peripheral surface of the operating lever, wherein
the reaction force adding member is arranged such that when the operating lever is tilted, the reaction force adding member applies elastic returning force to the operating lever so as to return the operating lever to a neutral position.

4. The operating device according to claim 1, wherein:
the operating lever includes first to fourth load transfer plates at the second end-side part;
the first and second load transfer plates are located between the first and second sensors so as to be spaced part from each other in the second direction and are arranged at positions where the first and second sensors can be pressed, respectively; and
the third and fourth load transfer plates are located between the third and fourth sensors so as to be spaced apart from each other in the third direction and are arranged at positions where to the third and fourth sensors can be pressed, respectively.

5. The operating device according to claim 4, wherein:
the supported portion is formed in a spherical shape;
the casing supports the supported portion such that the supported portion is rollable;
the first to fourth load transfer plates are arranged at four sides;
the third and fourth load transfer plates are arranged so as to be spaced apart from the first and second load transfer plates in the second direction; and
the first and second load transfer plates are arranged so as to be spaced apart from the third and fourth load transfer plates in the third direction.

6. The operating device according to claim 1, wherein:
the operating lever includes a load transfer portion at the second end-side part;
the load transfer portion includes four side surfaces facing both sides in the second direction and both sides in the third direction, respectively; and the first to fourth sensors are arranged so as to surround and contact the respective four side surfaces of the load transfer portion.

7. The operating device according to claim 1, wherein:

the operating lever includes a load transfer portion at the second end-side part; and the load transfer portion is formed in a spherical shape.

8. The operating device according to claim 1, wherein:

the operating lever includes a load transfer portion at the second end-side part;

the load transfer portion includes four surfaces opposing the respective first to fourth sensors; and the four surfaces curve so as to form a columnar shape and project toward the respective sensors.

* * * * *